Aug. 8, 1939.  I. MARKS  2,168,941
FILM GUIDE
Filed Feb. 16, 1937
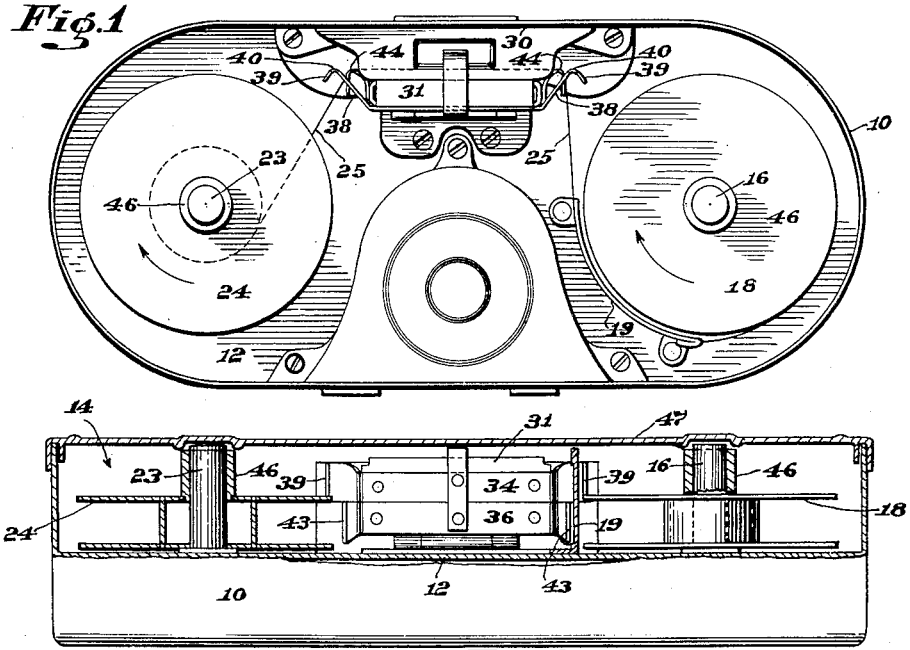
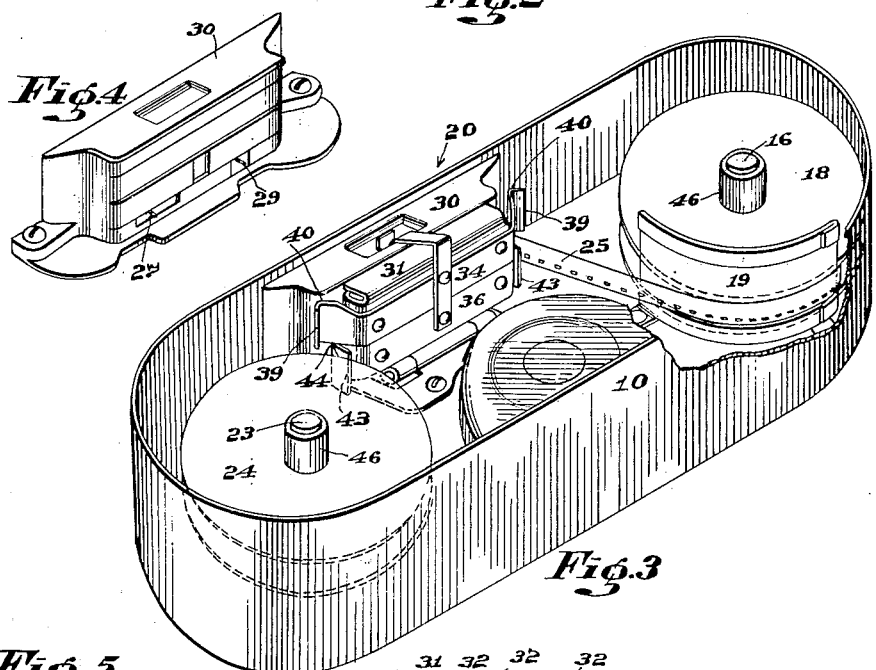
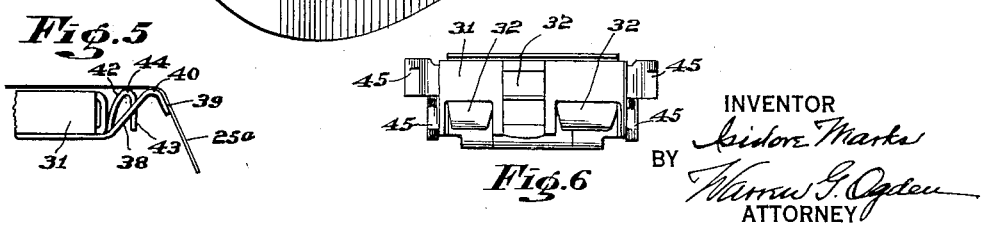
INVENTOR
Isidore Marks
BY
Warren G. Ogden
ATTORNEY Patented Aug. 8, 1939

2,168,941

UNITED STATES PATENT OFFICE 2,168,941

FILM GUIDE

Isidore Marks, Boston, Mass., assignor to Keystone Mfg. Co., Boston, Mass., a corporation of Massachusetts Application February 16, 1937, Serial No. 125,985

5 Claims. (Cl. 88—17)

This invention relates to improvements in film guides especially adapted to cameras for taking motion pictures and more particularly to film guides that enable an 8 mm. film to be accurately handled in a camera designed for the exposure of a 16 mm. film. It is an object of the invention to provide a duplex film guide having characteristic features of design that permit interchangeability of 16 mm. and 8 mm. films at will in the same camera without loss of efficiency or accuracy in the handling of either size of film.

To the accomplishment of this object and such others as may hereinafter appear, the invention comprises the features and combinations of parts hereinafter described by way of example in connection with the best form of the invention at present known, and then particularly pointed out in the appended claims.

The nature and scope of the invention will best be understood from a description of the preferred embodiment thereof as applied to a motion picture camera illustrated in the accompanying drawing, in which:

Figure 1 is a view, in plan, of a 16 mm. film motion picture camera, minus its lens, with the lid removed showing the spool chamber with 8 mm. film spools in place;

Fig. 2 is a view of the spool chamber in longitudinal section with the cover on and with the spools empty;

Fig. 3 is a view in perspective, similar to Fig. 1, having a portion of the camera case broken away to expose the film stripper associated with the full spool;

Fig. 4 is a view, in perspective, of the film feeding portion of the film gate with the film guide portion removed from its face;

Fig. 5 is a view, in plan, of the film guides at one end of the film gate showing the guiding of a 16 mm. film past the lens; and Fig. 6 is a view, in elevation, of the face of the hinged portion of the film gate with its latch and hinge support removed.

In the embodiment of the invention illustrated in the drawing the camera case 10 is provided with a partition 12 forming the floor of a spool chamber 14 (Fig. 2) above it and providing a control mechanism chamber below it. A fixed stud 16 stands at one end of the spool chamber for receiving the full spool 18 and a guide and stripper 19, proportioned for stripping a 16 mm. film, is curved to partly encircle the spool 18 at its inner side where the film is led to the film gate 20. A rotary driven shaft 23 stands at the other end of the spool chamber for receiving the take-up spool 24 onto the hub of which the film 25, after passing the centrally disposed film gate 20, is fastened. The take-up spool is keyed to its shaft which rotates it in the direction of the arrow, Fig. 1, to rewind the film as it is fed through the film gate by the feed teeth 27 and 29 (Fig. 4) within the fixed section 30 of the gate to which the hinged or movable section 31 of the film gate is latched as shown. The above film handling arrangement may be, and preferably is, the same as is found in known motion picture cameras.

The present invention relates to novel and improved film guides attached to or forming a part of the movable portion of the film gate adapted to guide either 8 mm. or 16 mm. films through the gate without change in the film handling apparatus, it being understood that the spool chamber is of such a depth, and that the stud 16 and shaft 22 therein are of such a height, as to receive the 16 mm. film spools.

The inner face of the film gate section 31 is provided with spring pressers 32 (Fig. 6) for holding the film yieldingly in position for the feed teeth 27 and 29 to engage in the marginal perforations. The film guide for directing a short straight run of the film through the gate is conveniently mounted on the back of the hinged section 31 (Fig. 3). As shown the guide comprises two strips 34 and 36 riveted to the back of the hinged gate section each of such length as to extend beyond each end thereof and each provided with its own characteristic end formation yet both end formations having a salient bend or guide face lying in a common vertical plane thus enabling the bends of the lower strip to be used alone to guide an 8 mm. film (see Fig. 1) or the bends of both strips to combine and be used together to guide a 16 mm. film (see Fig. 5). It will be understood that while two separate strips are desirable from the manufacturing standpoint because of the differing shape of the guide bends, it is within the scope of the invention to produce the duplex guide formation in other ways.

In forming a guide bend on the upper strip 34 (see Figs. 1 and 2) the material is bent forward at a substantially 45° angle to the plane of the rear wall of the gate section 31 forming an oblique leg 38, and its extreme end is turned back bluntly into a short hook 39 forming the terminal of a rounded shoulder 40 or guide face that lies in a vertical plane parallel to and just inside of the inner faces of the two film gate sections.

In forming a guide bend on the lower strip 36

(see Fig. 5) the material is bent sharply inward against the end wall of the gate section 31 forming a right-angular leg 42 and its extreme end is turned back sharply into a long hook 43, that crosses beneath the oblique leg 38 of the upper guide, and forms the terminal of a lower rounded shoulder or guide face 44 that lies in substantially the same vertical plane as the guide face formed by the upper rounded shoulder 40.

The formation of the guide faces 40 and 44, and their relation to each other, is as shown the same at both ends of the film gate 20 so that all four guide faces lie in substantially the same vertical plane. Each shoulder may be depressed or flattened as at 45 (Fig. 6) throughout a portion of its length to avoid undue frictional heat on the moving film.

Describing first the use of the camera for 8 mm. films as illustrated in Figs. 1, 2 and 3, each narrow spool 18 and 24 is provided with an extension hub 46 which hubs are clamped by the cover 47 (Fig. 2) to hold the spools and their films at the bottom of the spool chamber. In this position when the 8 mm. film is drawn on edge from the full spool 18 it is in line with the lower guide faces 44 of the film gate 20 against which it is held in passing the lens and thence onto the take-up spool 24. It will be observed that before passing the guide face 40 at the right of Fig. 1 the upper edge of the film must pass below the oblique leg 38 of the upper film guide which thus serves as an edge guide to hold the narrow film against lateral displacement or down in accurate tracking position for the operation of the feed teeth 27 and 29 thereon. Thus, the upper portion of the duplex film guide co-operates with the lower portion thereof to insure a continuous advance of the 8 mm. film during the period of exposure.

When a 16 mm. film is used in the camera the deeper spools, which the spool chamber was designed to accommodate, are naturally clamped in place by the cover 47. The vertical position of the 16 mm. film 25a is first determined by the guide stripper 19 and it then passes across all four of the guide faces, in the order 40, 44, 44, 40 (see Fig. 5), which faces it will be remembered are all in the same vertical plane.

Thus the film gate is provided with a duplex film guide at each end for accommodating, without alteration or substitution, either an 8 mm. or a 16 mm. film increasing to a considerable extent the adaptability and usefulness of the camera.

While it is preferred to employ the specific construction and arrangement of parts shown and described it will be understood that this construction is not essential except so far as specified in the claims and may be changed or modified without departing from the broader features of the invention.

What is claimed as new, is:

1. In a film handling apparatus including a gate to define a work path through which a film may be fed, film guides associated with said gate one at the entrance end and one at the exit end thereof each guide consisting of an upper and a lower part, said upper part having a leg oblique to the end of the gate terminating in a guide face lying in the vertical plane of the work path of the film, and said lower part having a guide face intermediate the upper guide face and the end of the gate also lying in the vertical plane of the work path of the film and having a leg crossing below the oblique leg of the upper part.

2. In a film handling apparatus including a gate to define a work path through which a film may be fed, a two-part film guide at each end of the gate the two parts at an end of the gate lying one above the other, the guide face of the lower part being nearer to the gate than the guide face of the upper part and both guide faces lying in the vertical plane of the work path of the film.

3. In a film handling apparatus including a gate to define a work path through which a film may be fed, a two-part film guide at each end of the gate each part at an end of the gate consisting of a strip having a hooked end presenting a rounded shoulder, said strips lying one above the other with their two shoulders both in the vertical plane of the work path of the film but having said two shoulders spaced from each other in the line of feed and the hook forming the lower shoulder being between the gate end and the upper shoulder.

4. A guide for film handling apparatus in combination with a gate for handling 16 mm. film and adapted to guide either 8 mm. or 16 mm. film past said gate comprising strip material projecting from each end of the lower portion of the gate and formed to present a pair of guide faces in the vertical plane of the work path of the film, said faces each having a depth for guiding 8 mm. film, and other strip material projecting from each end of the upper portion of the gate formed to present a second pair of guide faces in the vertical plane of the work path of the film each of which in association with the 8 mm. film guide face below it provides a depth for guiding 16 mm. film, said upper strip material having end portions in the line of feed lying outward of each lower guide face functioning as top gauges to hold 8 mm. film down as it is guided past the gate.

5. Film guiding apparatus for motion picture cameras including a gate defining a work path through which a film is fed from the full spool past the lens and to the take-up spool, having a double film guide at at least the entrance end of said gate comprising upper and lower parts forming separate guide faces but both lying in substantially the vertical plane of said work path, the guide face of the lower part having a height for guiding an 8 mm. wide film and the combined guide faces of both parts having a height for guiding a 16 mm. wide film, and said upper part having a portion extending across the path of travel of an 8 mm. wide film when it is engaged with said lower part, which portion serves as an edge guide for said 8 mm. film to hold it against lateral displacement as it is fed past the lens of the camera.

ISIDORE MARKS.